United States Patent [19]

Lohrbach et al.

[11] Patent Number: 4,995,095

[45] Date of Patent: Feb. 19, 1991

[54] METHOD AND APPARATUS FOR UTILIZING UNPRESENTED COMMUNICATION GROUPS

[75] Inventors: Jeffrey G. Lohrbach, Elgin; Gregory A. Dertz, Lake in the Hills; Michael S. Densmoor, Wheeling, all of Ill.

[73] Assignee: Motorola, Inc., Schaumburg, Ill.

[21] Appl. No.: 489,297

[22] Filed: Mar. 5, 1990

[51] Int. Cl.$^5$ .................. G05B 23/00; H04B 1/60; H04B 17/00

[52] U.S. Cl. .................. 455/9; 340/825.06; 455/67; 455/86; 455/226

[58] Field of Search .................. 455/9, 8, 15, 17, 33, 455/32, 34, 53, 56, 67, 166, 186, 226; 340/825.06, 825.5, 825.51, 825.52, 825.01; 370/95.1, 95.3

[56] References Cited

U.S. PATENT DOCUMENTS

| | | | |
|---|---|---|---|
| 4,573,207 | 2/1986 | Smith et al. | 340/825.5 |
| 4,698,805 | 10/1987 | Sasuta et al. | 455/17 |
| 4,817,190 | 5/1989 | Comroe et al. | 455/17 |
| 4,831,373 | 5/1989 | Hess | 455/33 |
| 4,839,892 | 6/1989 | Sasaki | 370/95.1 |
| 4,901,314 | 2/1990 | Lohrbach | 340/825.5 |

Primary Examiner—Reinhard J. Eisenzopf
Assistant Examiner—Chi H. Pham
Attorney, Agent, or Firm—Timothy W. Markison; Steven G. Parmelee; Joseph P. Krause

[57] ABSTRACT

In a communication system that comprises a plurality of communication resources, a plurality of consoles, a communication resource allocator, and a plurality of subscriber units arranged into a plurality of communication groups, the communication resource allocator comprises memory for storing presented and unpresented communication groups. By storing unpresented communication groups, a console, via an associated operator MUX interface module, may automatically utilize the unpresented communication groups without intervention from an operator of the console.

6 Claims, 3 Drawing Sheets

METHOD AND APPARATUS FOR UTILIZING UNPRESENTED COMMUNICATION GROUPS

TECHNICAL FIELD

This invention relates generally to communication systems and in particular to consoles that may utilize unpresented communication groups.

BACKGROUND OF THE INVENTION

A typical communication system, such as a trunked or conventional communication system, comprises a communication resource allocator, a plurality of communication resources, a plurality of consoles, and a plurality of communication units or subscriber units. Generally, the plurality of communication units, which may be mobile vehicle units or portable personal units, are arranged into related communication groups. For example, communication units operated by a city's police force may form one communication group, while communication units operated by the city's fire department, dog catcher units, highway crews, and civil engineers may form other communication groups. The communication groups may be further divided into subgroups; for example, the police communication group may be divided by districts such as police 1, police 2, etc.

Typically, communication units in a trunked communication system are arranged into talk groups, where the talk groups share the plurality of communication resources on an "as requested basis". For a communication unit to access a communication resource, it transmits an inbound signalling word (ISW) to the communication resource allocator via a control communication resource. If a communication resource is available, the communication resource allocator transmits an outbound signaling word (OSW) indicating which communication resource is assigned to the requesting communication unit. (The OSW is also received by all communication units, however, only the communication units in the same talk group as the requesting communication unit will affiliate themselves with the assigned communication resource such that they may communicate to each other via the assigned communication resource.) In contrast, communication units in a conventional communication system access a permanently assigned communication resource by activating a push-to-talk (PTT) button, or similar accessing process, to notify the communication resource allocator that the communication unit is accessing the communication resource. (There are other differences between trunked and conventional systems but they are not relevant to this invention.)

The plurality of consoles, which may be devices as defined in Motorola Inc. publication No. R4-2-37C, Mar. 1988, entitled System Planner, typically comprise a plurality of channel control modules (CCMs), where each CCM is assigned a communication group and/or subgroup. The assigned communication groups and/or subgroups are presented to an operator of the console such that the operator may monitor and perform supervisory functions for each of the presented communication groups and/or subgroups. The supervisory functions a console may perform comprise resetting emergency conditions, manually reconfiguring the system, and transmitting at a priority level. Resetting emergency conditions consists of answering an emergency call, resetting audio and/or visual emergency call indicators and deactivating the manual system reconfiguration. However, these supervisory functions can only be manually performed for presented communication groups and/or subgroups.

By limiting a console to monitoring and manually performing supervisory functions for presented communication groups only, communication system efficiency may not be optimal. Furthermore, such communication systems may require additional consoles and operators to supervise additional communication groups, thereby increasing the space requirements and cost of these systems. Therefore, a need exists for a communication system that allows consoles to monitor unpresented communication groups as well as presented communication groups and to automatically perform at least some supervisory, or communication, functions for unpresented communication groups as well as presented communication groups.

SUMMARY OF THE INVENTION

These needs and others are substantially met by the method and apparatus for utilizing unpresented communication groups disclosed herein. In a communication system having a plurality of repeaters that transceive information on a plurality of communication resources, a plurality of communication groups, a communication resource allocator, and a plurality of consoles, a console automatically performs at least some supervisory functions, or communication functions, for unpresented communication groups as well as presented communication groups. By selecting a predetermined number of unpresented communication groups to produce phantom communication groups and storing them in memory of an associated operator MUX interface (OMI), at least one phantom communication group may be utilized when executing a predetermined communication function.

In an embodiment of the present invention, each of the plurality of consoles comprises a plurality of channel control modules (CCMs), where individual CCMs are assigned a presented communication group and at least one CCM is reserved as a scanning CCM. The scanning CCM is shared by a predetermined number of the phantom communication groups such that one of the predetermined number of phantom communication groups is assigned to the scanning CCM when communication is detected within the phantom communication group. Once the phantom communication group is assigned to the scanning CCM, an operator may monitor and perform supervisory functions for the assigned phantom communication group. When communication ends within the phantom communication group, it is deassigned from the scanning CCM such that another phantom communication group may be assigned to the scanning CCM.

In another embodiment of the present invention, each of the plurality of consoles comprises a plurality of channel control modules (CCMs). At least one of the CCMs is assigned to a presented communication group, wherein a phantom communication group, or groups, is (are) linked to the presented communication group, such that the phantom communication groups are monitored by the operator. By having at least one phantom communication group linked to a presented communication group, an operator may monitor more than one communication group per CCM without adding additional CCMs to the console.

BEST MODE FOR CARRYING OUT THE INVENTION

Figure 1:
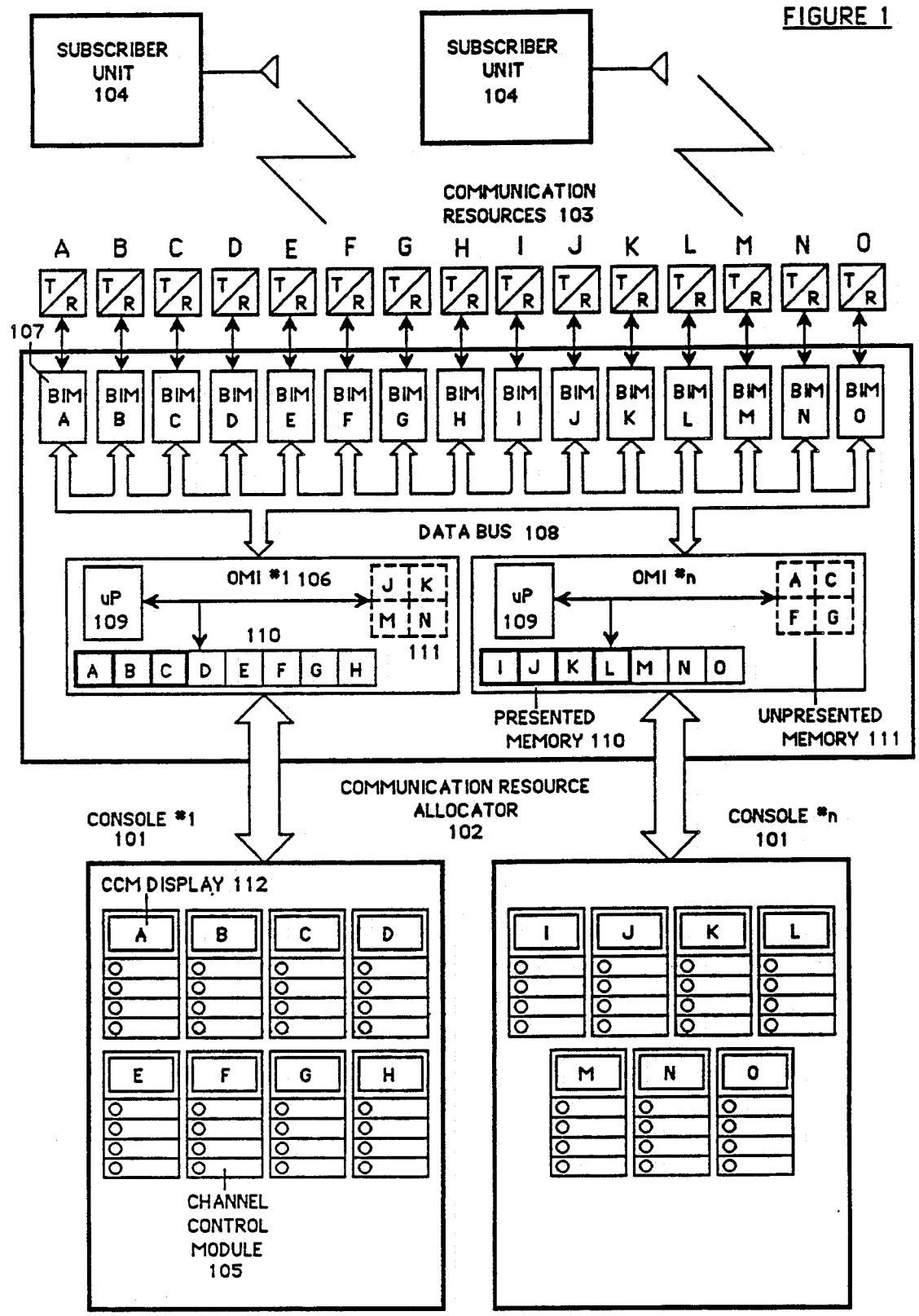
FIG. 1 illustrates a conventional communication system that incorporates the present invention.

FIG. 1 illustrates a conventional communication system (100) that incorporates the present invention. The communication system (100) comprises a plurality of consoles (101) (two shown), a communication resource allocator (102), a plurality of repeaters that transceive information on a plurality of communication resources (103) (fifteen shown, A-O), and a plurality of subscriber, or communication, units (104) (two shown). Each console (101) comprises a plurality of channel control modules (CCM) (105) which may comprise a CCM display (112). The communication resource allocator (102) comprises a plurality of operator MUX interface modules (OMI) (106) (two shown), a plurality of base interface modules (BIM) (fifteen shown, A-O), and a data bus (108). For this discussion, the subscriber units (104) are arranged into communication groups and each communication group is assigned to one of the repeaters (103). Also, each repeater (103) is associated with one BIM (107) and transceives information on one communication resource, where a communication resource may be a carrier frequency, a frequency pair, TDM time slots, and/or a telephone line.

Each OMI (106) comprises a microprocessor, or similar device (109), memory for storing presented communication groups (presented memory) (110), and memory for storing phantom communication groups (phantom memory) (111). (A presented communication group is one that is assigned to a CCM and one that an operator monitors and may perform manual supervisory functions for. A phantom, or unpresented, communication group is one that is not presently assigned to a CCM and one that the operator does not monitor and may not perform manual supervisory functions for.) The presented memory (110) and the phantom memory (111) may be random access memory devices, or similar, and may be the same device as contemplated by the present invention. Nevertheless, for illustrative purposes, the presented memory (110) and phantom memory (111) will be treated as separate devices, where the phantom memory (111) has available memory for storing four phantom communication groups.

The presented memory (110) may comprise memory locations for storing fixed presented communication groups and assignable communication groups. (The memory location for storing fixed presented communication groups is delineated by bold lines.) Fixed presented communication groups are typically determined by a system manager and are not changeable or selectable by an operator of a console (101). The assignable communication groups may be selected by the operator of a console or by the system manager. Assignable communication groups may be changed during non-priority times without substantially impeding the communication system's operation. For a further discussion of the system manager see co-pending application filed on Dec. 29, 1989, Ser. No. 07/458,912, entitled SUPERVISORY CONTROL ALLOCATION METHOD AND APPARATUS.

Generally, phantom, or unpresented, communication groups are not assigned to a CCM (not presented to the operator of the console) but, nevertheless, may be used when automatically executing a predetermined communication function. The phantom communication groups assigned to a console are stored in memory of the associated OMI (phantom memory). By accessing the phantom memory when executing a predetermined communication function the accessed phantom communication group may be incorporated into the execution of the predetermined communication function. The predetermined communication functions presently comprise scanning phantom communication groups, permanent patch of phantom communication groups, transferring communication groups between assignable CCMs and phantom memory in the associated OMI, and system reconfiguration utilizing phantom communication groups. When executing a system reconfiguration, the number of phantom communication groups that are stored in an associated OMI may be determined by the automatic system reconfigurations that the console may execute. (Automatic system reconfiguration is described in co-pending application having the same filing date as this application and is entitled A METHOD AND APPARATUS FOR AUTOMATICALLY EXECUTING SYSTEM RECONFIGURATIONS.)

Figure 2A:
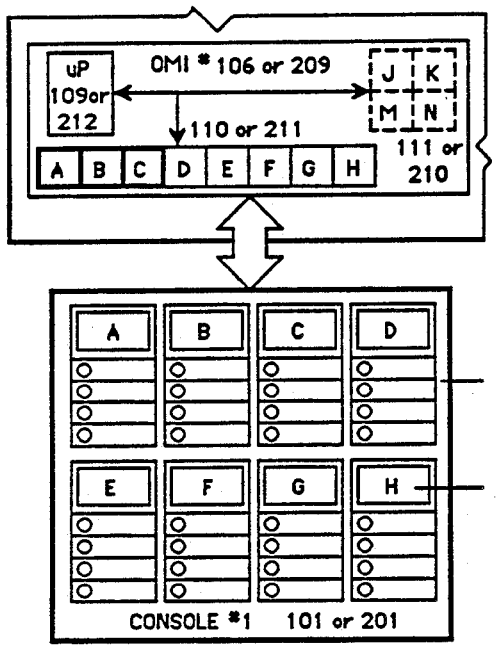
FIGS. 2A and 2B illustrate a console and its associated operator MUX interface (OMI) utilizing the present invention.
Figure 2B:
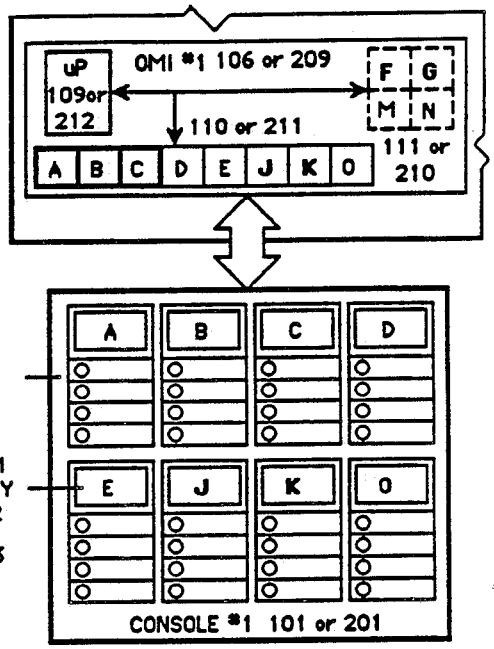

FIGS. 2A and 2B illustrate the transfer of communication groups between assignable CCMs (105 or 205) and the phantom memory in the associated OMI (111 or 210). For illustrative purposes, the transfer of communication groups between assignable CCMs and the phantom memory in the associated OMI will be discussed with reference to the conventional communication system of FIG. 1, however, the transferring of communication groups is equally applicable to the trunked communication system of FIG. 5. (The trunked communication system of FIG. 5 will be discussed below.) FIG. 2A shows the presented memory (110) containing three fixed communication group locations (illustrated by bold lines) and five assignable communication group locations. The communication groups affiliated with repeater A, B, and C have a fixed assignment to the first three CCMs (105), respectively, while the communication groups affiliated with repeaters D, E, F, G, and H are assigned to the remaining CCMs (105). These assignments present the communication groups to the operator of the console as monitored, or presented, communication groups. (The particular communication group that is assigned to the CCM is displayed on the CCM display (112).

Assume, for illustrative purposes, that is desired to deassign, as monitored communication groups, communication groups affiliated with repeaters F, G, and H. Once the particular communication groups have been identified, the associated OMI, via the microprocessor (109), determines if the communication group is needed. The communication group may be needed for other predetermined communication functions, such as automatic system reconfiguration or phantom communication group scanning. If it is determined that a communication group to be deassigned is needed, it is assigned to the phantom memory of the associated OMI (111) before it is deassigned. If it is determined that the communication group is not needed, it is deassigned and is no longer affiliated with the console as a presented communication group or as a phantom communication group. Thus, as shown, communication groups F and G may be needed for other communication functions and are stored in the phantom memory (111). Communication group H is not needed and is no longer affiliated with the console (105).

If the communication groups F, G, and H were deassigned such that new communication groups could be assigned to an assignable communication group location, then the associated OMI checks the phantom memory for the communication groups to be assigned. If a communication group is stored in the phantom memory (111), the associated OMI assigns the communication group to an available assignable communication group location and deassigns it from the phantom memory (111). Communication groups J and K in FIG. 2B were stored in phantom memory (111) and thus were assigned to an assignable communication group location of the presented memory (110) such that they are now presented to the operator of the console (105) as monitored communication groups. However, if a communication group to be assigned is not in the phantom memory (111), then the communication group is directly assigned to the assignable communication group location in presented memory (110) and thus is presented to the operator of the console. As shown in FIG. 2B, communication group O was not in the phantom memory (111) prior to being assigned to the assignable communication group location of the presented memory (110).

Figure 3:
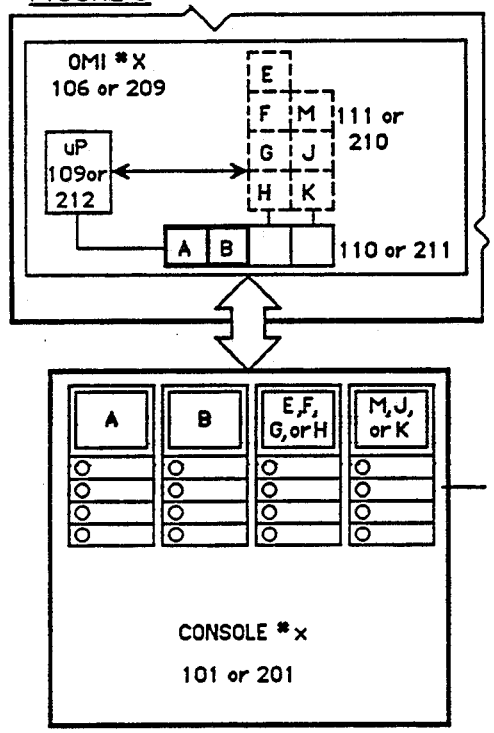
FIG. 3 illustrates a console and its associated OMI, wherein two CCMs are used as scanning CCMs per the present invention.

FIG. 3 illustrates the predetermined communication function of phantom communication group scanning. As shown, the presented memory (110) comprises two fixed communication group locations (highlighted by bold lines) wherein communication groups A and B are assigned. The presented memory also comprises two scanning communication group locations which are affiliated with two scanning CCMs, such that when a communication group is assigned to the scanning communication group location it is presented to the operator of the console on the affiliated scanning CCM. The phantom memory (111) is shown storing communication groups E, F, G, H, I, J, and K, where communication groups E, F, G, and H are affiliated with a first scanning communication group location (third from the left) while the remaining communication groups are affiliated with the second scanning communication group location (forth from left).

When communication is detected in one of the phantom communication groups by the associated OMI, that phantom communication group is assigned to its affiliated scanning communication group location in the presented memory (110) if the affiliated scanning communication group location is available. (Communication may comprise audio transmissions, data transmission, requested access to a communication resource, or any detectable conveyance of information from a communication unit.) Once assigned, the phantom communication group is deassigned from the phantom memory, however, its location is reserved. If the affiliated scanning communication group location is not available, the phantom communication group may be assigned to another available scanning communication group location in the presented memory (110). If there are no available scanning communication group locations, the phantom group may be placed in a queue, in the microprocessor (109), to await the next available scanning communication group location, or it may be ignored such that the communication goes unmonitored by the operator of the console. Once the phantom communication group is assigned to an available scanning communication group location, it is presented to the operator of the console on one of the scanning CCMs. As shown, the phantom communication groups may be individually assigned to a scanning CCM and displayed on the CCM display (112).

When communication ends in a phantom communication group that is assigned to a scanning communication group location, the assignment is deleted. Prior to delected the assignment, the phantom communication group is reassigned to the phantom memory (111) in a reserved location. After the deassignment is complete, any other phantom communication group may be assigned to the scanning communication group location if communication is detected therein. Thus, if communication was detected in communication group E and its affiliated scanning communication group location in the presented memory (110) was available, communication group E would be assigned to the scanning communication group location. Once the assignment was made, communication group E would be presented to the operator on the first scanning CCM. Typically, the communication group assigned to the scanning communication group location will be indicated in the CCM display (112). When communication ends in communication group E, it is deassigned from the scanning communication group location and reassigned to the phantom memory (111).

Figure 4:
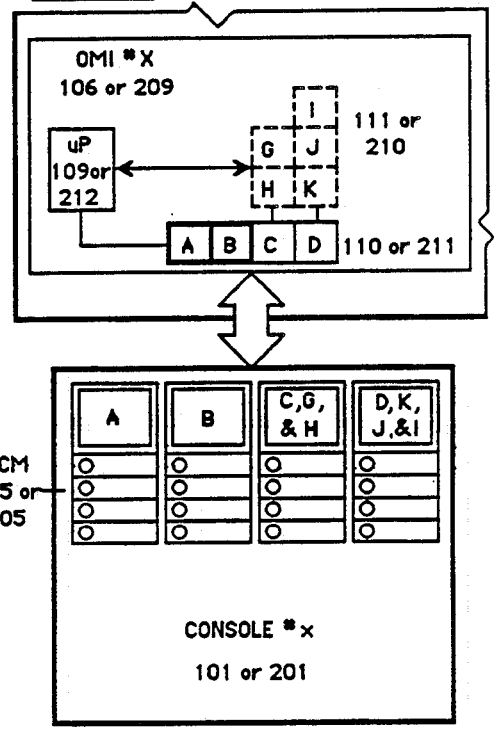
FIG. 4 illustrates a console and its associated OMI, wherein two CCMs are permanently patched to several communication groups in accordance with the present invention.

FIG. 4 illustrates the predetermined communication function of a permanent phantom communication group patch. As shown, the presented memory (110) comprises two fixed communication group locations (highlighted by bold lines) wherein communication groups A and B are assigned. The presented memory also comprises two permanent patch communication group locations which are affiliated with two permanent patch CCMs, such that all phantom communication groups linked to the permanent patch communication group location are monitored by the operator of the console on the affiliated permanent patch CCM. (The operator may or may not be notified of which phantom communication groups are assigned to the permanent patch locations.) Thus, communication groups C, H, and G are presented on one permanent patch CCM, while communication groups D, K, J, and I are presented on the other.

Figure 5:
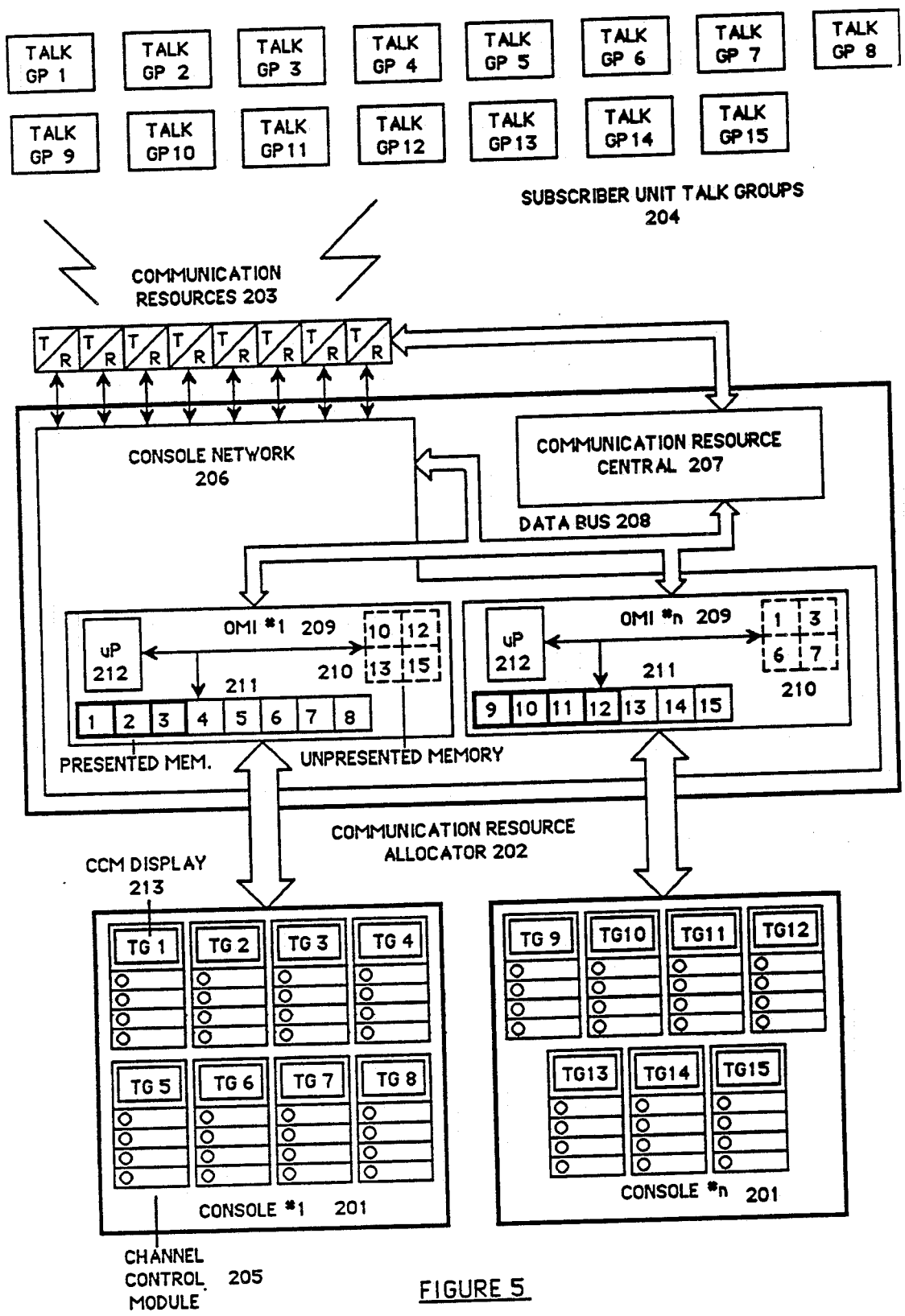
FIG. 5 illustrates a trunked communication system that incorporates the present invention.

FIG. 5 illustrates a trunked communication system (200) that incorporates the present invention. The trunked communication system (200) comprises a plurality of consoles (201) (two shown), a communication resource allocator (202), a plurality of repeaters that transceive information on a plurality of communication resources (203) (eight shown), and a plurality of subscriber units arranged into a plurality of talk groups (204) (fifteen shown). (For the purposes of this application when in reference to a trunked communication system, a talk group is equivalent to a communication group.) Each of the consoles (201) comprises a plurality of channel control modules (CCMs) (205), where each CCM (205) comprise a CCM display (213) that indicates the talk group that is assigned to the CCM's associated presented memory location (211). The communication resource allocator (202) comprises a console network (206), a communication resource central (207), and data bus (208), and a plurality of operator MUX interfaces (OMIs) (209) (two shown). (Typically for trunked communication systems the OMI is entitled trunked operator MUX interface (TOMI), however, for the purpose of this application the terms OMI and TOMI are interchangeable.)

Each OMI (209) comprises a microprocessor (212), phantom memory (210), and presented memory (211). The presented memory (211), which contains presented communication group assignments, may comprise fixed communication group locations (highlighted by bold lines) and assignable communication group locations. The presented and phantom memories (210 and 211) may comprise random access devices or a single random access device. The assignable communication group locations may also comprise scanning communication group locations or permanent patch communication group locations. The present invention, as described above with reference to the conventional communication system of FIG. 1 is equally applicable to the trunked communication system of FIG. 5.

What is claimed is:

1. In a communication system having a plurality of repeaters that transceive information on a plurality of communication resources, a plurality of communication groups, a plurality of consoles, and a communication resource allocator having a plurality of operator MUX interface modules (OMIs), wherein each of the plurality of consoles is operably associated with an OMI of the plurality of OMIs to produce an associated OMI and each of the plurality of consoles monitors, as monitored communication groups, a predetermined number of presented communication groups of the plurality of communication groups, a method for a console of the plurality of consoles to automatically utilize unpresented communications groups comprising the steps:
    (a) storing unpresented communication groups of the plurality of communication groups as phantom communication groups in phantom memory of the associated OMI;
    (b) accessing at least one of the phantom communication groups prior to performing a predetermined communication function;
    (c) executing the predetermined communication function, wherein the predetermined communication function incorporates the at least one of the phantom communication groups and is executed without intervention from an operator of the console of the plurality of consoles.

2. The method of claim 1 wherein each of the plurality of consoles consists of at least a plurality of channel control modules, where at least some of the plurality of channel control modules are assigned one of the predetermined number of presented communication groups and at least one of the plurality of channel control modules is reserved as a scanning channel control module, wherein executing the predetermined communication function comprises the substeps of:
    (c1) detecting communication within one of the phantom communication groups;
    (c2) assigning the phantom communication group of substep (c1) to the scanning channel control module, if available, such that the phantom communication group of substep (c1) is presented to the operator of the console.

3. The method of claim 2 further comprises the substeps of:
    (c3) deassigning the phantom communication group of substep (c1) when the communication of substep (c1) ends;
    (c4) restoring the phantom communication group of substep (c1) in the memory of the associated OMI, such that the phantom communication group of substep (c1) is no longer presented to the operator of the console.

4. The method of claim 1 wherein each of the plurality of consoles consists of at least a plurality of channel control modules (CCMs), individual CCMs of the plurality of CCMs are assigned a presented communication group of the predetermined number of presented communication groups, and at least one of the individual CCMs is assignable to produce an assignable CCM, the execution of the communication function comprises the substeps of:
    (c1) assigning the presented communication group that is assigned to the assigned CCM to the phantom memory of the associate OMI if the presented communication group is needed by the console;
    (c2) deassigning the presented communication group of substep (c1) from the assignable CCM.

5. The method of claim 4 further comprises the substeps of:
    (c3) determining whether a requested communication group is stored in the phantom memory of the associated OMI;
    (c4) if the requested communication group is stored in the phantom memory of the associated OMI, assigning the requested communication group to the assignable CCM; and
    (c5) if the requested communication group is assigned to the associated OMI, deassigning the requested communication group from the phantom memory of the associated OMI.

6. The method of claim 1 wherein each of the plurality of consoles consists of a plurality of channel control modules (CCMs), where each of the plurality of CCMs is assigned one of the predetermined number of presented communication groups to produce an assigned presented group, wherein executing the communication function comprises coupling at least one of the phantom communication groups to at least one of the plurality of CCMs, such that communications in the at least one of the phantom communication group and the assigned presented group are present on the at least one of the plurality of channel control modules.

* * * * *